UNITED STATES PATENT OFFICE 2,678,321

DIALKYLAMINOALKYL AMIDES OF α,α-DIARYLTOLUIC ACIDS AND THEIR SALTS

Carl Peter Krimmel, Mundelein, Ill., assignor to G. D. Searle & Co., Chicago, Ill., a corporation of Illinois No Drawing. Application May 7, 1951,
Serial No. 225,059

16 Claims. (Cl. 260—389)

The present invention relates to a group of new organic compounds and in particular to the dialkylaminoalkyl amides of α,α-diaryl-o-, m-, and p-toluic acids, to their salts, and to methods for their production.

This application is a continuation-in-part of my copending application Serial No. 145,600, filed February 21, 1950.

By this invention I have provided new compositions of matter which may be represented by the following structural formula

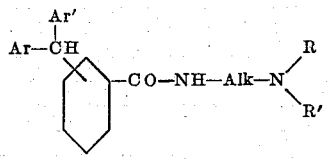

wherein Ar and Ar' are lower aromatic groups, wherein Alk is a lower alkylene radical, and wherein R and R' are lower alkyl groups.

In the foregoing structural formula Ar and Ar' may represent such lower aromatic groups as phenyl; o-, m-, and p-tolyl; o-, m-, and p-chlorophenyl; o-, m-, and p-anisyl and the like. The Alk group represents bivalent, saturated, aliphatic hydrocarbon radicals of from two to eight carbon atoms. These radicals are derived from straight-chain or branched-chain aliphatic hydrocarbons and include radicals such as ethylene, propylene, butylene, amylene, and polymethylene radicals such as trimethylene, tetramethylene, pentamethylene, and hexamethylene.

Among the radicals which R and R' may represent are such lower alkyl groups as methyl, ethyl, propyl, butyl, amyl, hexyl, cyclopentyl, and cyclohexyl, wherein the propyl, butyl, amyl, and hexyl groups may be either of the straight-chain or branched-chain type.

Compounds in which the —NRR' radical is a nitrogen-containing heterocycle are likewise within the scope of this invention. Thus NRR' may represent such heterocyclic radicals as N-piperidino, N-lupetidino, N-pyrrolidino, N-morpholino, N-thiamorpholino, N-piperazino, N'-alkyl-N-piperazino and the like.

The organic bases of the foregoing type form salts with a variety of inorganic and strong organic acids including sulfuric, phosphoric, hydrochloric, hydrobromic, sulfamic, citric, oxalic, ascorbic, and related acids. They also form quaternary ammonium salts with a variety of organic esters of sulfuric, hydrohalic, and aromatic sulfonic acids. Among such esters are methyl iodide, chloride and bromide, ethyl chloride, propyl bromide, butyl chloride, isobutyl chloride, benzyl chloride and bromide, phenethyl bromide, naphthylmethyl chloride, dimethyl sulfate, diethyl sulfate, methyl benzenesulfonate, ethyl toluenesulfonate, ethylene chlorohydrin, propylene chlorohydrin, allyl chloride, methallyl bromide and crotyl bromide.

The amides of this invention have been found to possess a number of highly useful therapeutic properties. Thus they have been shown to be active spasmolytics, diuretics, and cardiovascular agents.

The acids which constitute the starting materials for the amides of this invention are prepared by conventional methods such as that of Drory (Ber. Deut. Chem. Ges. 24, 2572; 1891). Thus α,α-diphenyl-o-toluic acid, M. P. 161–164° C., is prepared by causing o-cyanobenzal chloride, benzene, and aluminum chloride to react to obtain o-cyano-triphenylmethane which is hydrolyzed to the acid with 25% alcoholic potassium hydroxide. The o-cyanobenzal chloride is conveniently obtained by the chlorination of o-toluonitrile by ultraviolet radiation. In the same manner, starting with m-toluonitrile and p-toluonitrile, α,α-diphenyl-m-toluic acid, M. P. 180–182° C. and α,α-diphenyl-p-toluic acid, M. P. 163–165° C. are respectively obtained.

My invention will be described more fully in conjunction with the following examples. It should be understood, however, that these examples are given by way of illustration only and that the invention is not to be construed as limited in spirit or in scope by the details set forth. It will be apparent to those skilled in the art that many modifications in materials and methods may be made without departing from the invention. In each of these examples, temperatures are given in degrees centigrade, (° C.), parts by weight are given in grams (g.), and parts by volume in milliliters (ml.).

EXAMPLE 1

β-Diethylaminoethyl amide of α,α-diphenyl-o-toluic acid

A mixture of 40 g. of α,α-diphenyl-o-toluic acid, 300 ml. of carbon tetrachloride, and 40 ml. of thionyl chloride was refluxed on the steam bath for three hours. The excess of the volatile reagents was then removed under vacuum, the residue was taken up in 1000 ml. of anhydrous ethyl ether, and 16.2 g. of β-diethylaminoethylamine were added. The resultant precipitate was removed from the reaction mixture by filtration, treated with water, and made alkaline with potassium hydroxide. The base, which was released in solid form, was extracted with ether, the ether extract was dried over anhydrous potassium carbonate, filtered, and stripped of ether on the steam bath. The residual syrup crystallized upon standing. Recrystallization from petroleum ether gave 26 g. of white granular material, which on analysis was shown to contain 7.14% nitrogen (calculated 7.25% N).

To a solution of 10 g. of the basic diethylaminoethyl amide of $\alpha,\alpha$-diphenyl-o-toluic acid in 50 ml. of butanone were added 9.5 ml. of a 10% solution of hydrogen chloride in anhydrous isopropanol. The resultant white crystalline precipitate of the hydrochloride, after recrystallization from butanone, melted at 197–199°.

EXAMPLE 2

*$\beta$-($\alpha,\alpha$-Diphenyl-o-toluamido)ethyltriethylammonium bromide*

A mixture of 15 g. of the $\beta$-diethylaminoethyl amide of $\alpha,\alpha$-diphenyl-o-toluic acid, 8.7 g. of ethyl bromide, and 15 ml. of butanone was placed in a shielded pressure bottle and heated in a steam bath for three hours. The crystals which separated from the cooled reaction mixture were filtered, washed with butanone, and dried in the steam cabinet. The 16 g. of the quaternary salt, melting at 251–255° with decomposition, may be recrystallized from absolute ethanol to obtain a product melting at 254–256° with decomposition. It has the formula

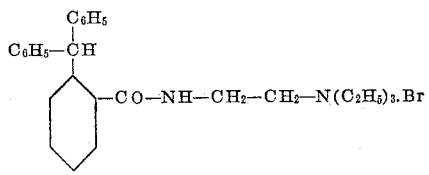

EXAMPLE 3

*$\gamma$-Dimethylaminopropyl amide of $\alpha,\alpha$-diphenyl-o-toluic acid*

A mixture of 30 g. of $\alpha,\alpha$-diphenyl-o-toluic acid, 200 ml. of carbon tetrachloride, and 30 ml. of thionyl chloride was refluxed on the steam bath for three hours. The excess of volatile reagents was then removed under vacuum, the residue was taken up in 800 ml. of anhydrous ethyl ether, and 14.3 g. of $\gamma$-dimethylamino-propylamine were added. The reaction mixture was extracted with dilute hydrochloric acid and the extract was made alkaline with potassium hydroxide. The orange oil which separated crystallized on standing to a granular solid. After successive recrystallizations from a solution of ethyl ether-petroleum ether and petroleum ether, a white crystalline powder was obtained. Analysis: Calculated, basic N=3.76%. Found, basic N=3.76%.

To a solution of 6.5 g. of the $\gamma$-dimethylaminopropyl amide of $\alpha,\alpha$-diphenyl-o-toluic acid in 100 ml. of anhydrous ether were added 6.2 ml. of a 10% solution of hydrogen chloride in isopropanol. The tacky deposit of the hydrochloride was washed by ether decantation and then heated with 100 ml. of butanone. This caused the hydrochloride to separate as a crystalline powder which, after filtration and air drying, weighed 5.3 g. and melted at 172–175°.

EXAMPLE 4

*$\gamma$-Diethylaminopropyl amide of $\alpha,\alpha$-diphenyl-o-toluic acid*

A mixture of 30 g. of $\alpha,\alpha$-diphenyl-o-toluic acid, 300 ml. of carbon tetrachloride, and 30 ml. of thionyl chloride was refluxed on the steam bath for three hours. The excess of the volatile reagents was then removed under vacuum, the residue was taken up in 400 ml. of anhydrous ethyl ether, and 18.2 g. of $\gamma$-diethylaminopropylamine were added. The resultant gummy precipitate was successively extracted with water and dilute hydrochloric acid. The combined extracts were made alkaline with sodium hydroxide, the released oil was extracted with ether, the extract was dried over anhydrous potassium carbonate, the ether was stripped on the steam bath, and the residue was vacuum distilled to yield 25 g. of viscous oil boiling at about 231–241° and 0.3 mm. pressure.

To a solution of 10 g. of the above $\gamma$-diethylaminopropyl amide of $\alpha,\alpha$-diphenyl-o-toluic acid in 40 ml. of acetone were added 9.1 ml. of a 10% solution of hydrogen chloride in anhydrous isopropanol. After intimate mixing, 1000 ml. of anhydrous ethyl ether were added to yield an initial gummy deposit which became crystalline upon standing. Filtration and air drying gave 9.5 g. of a white hydrochloride melting at 170–173°.

EXAMPLE 5

*$\gamma$-($\alpha,\alpha$-Diphenyl-o-toluamido)propyltriethylammonium bromide*

A mixture of 12 g. of the $\gamma$-diethylaminopropyl amide of $\alpha,\alpha$-diphenyl-o-toluic acid, 6.6 g. of ethyl bromide, and 20 ml. of butanone was placed in a shielded pressure bottle and heated in a steam bath for three hours. The crystals which separated from the cooled reaction mixture were filtered, washed with butanone and recrystallized from isopropanol to give 7.5 g. of white crystals having a melting point of 193–195°.

EXAMPLE 6

*$\delta$-Diethylamino-$\alpha$-methylbutyl amide of $\alpha,\alpha$-diphenyl-o-toluic acid*

A solution of 60 g. of $\alpha,\alpha$-diphenyl-o-toluic acid, 60 ml. of thionyl chloride, and 400 ml. of carbon tetrachloride was refluxed on the steam bath for three hours. The excess volatile reagents were removed by vacuum distillation on the steam bath. The residue was dissolved in 300 ml. of acetone and 33.2 g. of 5-diethylamino-2-aminopentane were added dropwise with stirring. The reaction mixture was refluxed for three hours, and the acetone was removed by vacuum distillation on the steam bath. The residue was taken up in water, ether washed, made alkaline with potassium hydroxide and ether extracted. The extract was separated, dried over anhydrous potassium carbonate, filtered and ether stripped. Vacuum distillation of the residue yielded 60.6 g. of pale yellow syrup boiling at about 260–265° C. and 2 mm. pressure.

EXAMPLE 7

*$\gamma$-Dimethylaminopropyl amide of $\alpha,\alpha$-di-(o-tolyl)-o-toluic acid*

A mixture of 33 g. of $\alpha,\alpha$-di-(o-tolyl)-o-toluic acid, 250 ml. of carbon tetrachloride, and 30 ml. of thionyl chloride was refluxed on the steam bath for three hours. After removal of the excess of the volatile reagents by vacuum distillation, the residue was taken up in 800 ml. of anhydrous ether and 14.4 g. of $\gamma$-dimethylaminopropylamine were added. The reaction mixture was extracted with dilute hydrochloric acid and the extract made alkaline with sodium hydroxide. Purification was carried out by the methods described in the previous examples. The product, the γ-dimethylaminopropyl amide of α,α-di-(o-tolyl)-o-toluic acid, was readily soluble in ether and related organic solvents.

EXAMPLE 8

β-Diethylaminoethyl amide of α,α-di(p-anisyl)-o-toluic acid

A mixture of 24 g. of α,α-di-(p-anisyl)-o-toluic acid, 175 ml. of carbon tetrachloride and 20 ml. of thionyl chloride was refluxed on the steam bath for three hours. The excess of the volatile reagents was then removed under vacuum, the residue was taken up in anhydrous ether, and 8.1 g. of β-diethylaminoethylamine were added. The reaction mixture was extracted with dilute hydrochloric acid and the base liberated by treatment with alkali. Purification was carried out by the usual methods. The product, the β-diethylaminoethyl amide of α,α-di-(p-anisyl)-o-toluic acid, was readily soluble in ether and related organic solvents.

EXAMPLE 9

β-Diisopropylaminoethyl amide of α,α-diphenyl-m-toluic acid

A solution of 30 g. of α,α-diphenyl-m-toluic acid in 100 ml. of carbon tetrachloride was treated with 15 ml. of thionyl chloride and maintained at reflux temperature for 2 hours. The excess of volatile material was then removed under vacuum and the residue dissolved in 500 ml. of ether. To this solution 6.5 g. of β-diisopropylaminoethylamine were added dropwise with stirring. The precipitate was extracted with water. The aqueous layer was separated, rendered alkaline by addition of sodium hydroxide and extracted with ether. The ether extract was dried over anhydrous potassium carbonate, stirred with decolorizing charcoal, filtered, and evaporated. The β-diisopropylaminoethylamide of α,α-diphenyl-m-toluic acid remained as a pale, viscous syrup. It has the structural formula

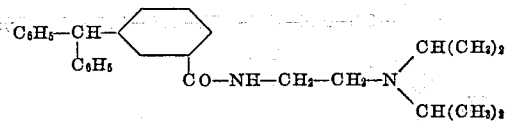

EXAMPLE 10

β-Diethylaminoethyl amide of α,α-diphenyl-p-toluic acid

The acid chloride residue obtained from 29 g. of α,α-diphenyl-p-toluic acid and 11.6 g. of 2-diethylaminoethylamine were caused to react under the same conditions as in Example 8. The resultant β-diethylaminoethyl amide of α,α-diphenyl-p-toluic acid was collected at about 258–264° C. at 0.5 mm. pressure. It was obtained as a syrup which crystallized upon standing.

To a solution of 10 g. of the β-diethylaminoethyl amide of α,α-diphenyl-p-toluic acid in 1000 ml. of anhydrous ethyl ether was slowly added with stirring an equivalent of hydrogen chloride as a 25% solution in anhydrous isopropanol. A tacky white deposit was formed. The ether was decanted, and the tacky deposit taken up in boiling butanone and decolorized with charcoal. Cooling yielded 4.8 g. of a white, crystalline, water-soluble powder melting at 147–149° C. It has the structural formula

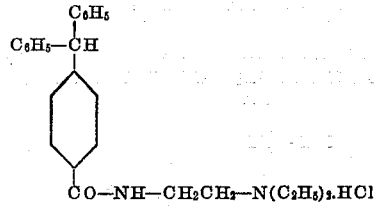

EXAMPLE 11

γ-Diethylaminopropyl amide of α,α-diphenyl-p-toluic acid

A solution of 29 g. of α,α-diphenyl-p-toluic acid, 30 ml. of thionyl chloride, and 200 ml. of carbon tetrachloride was refluxed on the steam bath for two hours. The excess volatile reagents were removed by vacuum distillation on the steam bath. The residue was dissolved in 200 ml. of acetone and 13 g. of γ-diethylaminopropylamine were added dropwise with stirring. The reaction mixture was refluxed for three hours and the acetone was removed by vacuum distillation on the steam bath. The residue was taken up in water and ether extracted. The aqueous layer was separated, made alkaline with potassium hydroxide and ether extracted. The ether extract was dried over anhydrous potassium carbonate, filtered, and ether stripped. Vacuum distillation of the residue yielded 23 g. of the γ-diethylaminopropyl amide of α,α-diphenyl-p-toluic acid which was collected from 274–279° C. and 1.0 mm. pressure as a yellow syrup.

An equivalent of hydrogen chloride gas, as a 25% solution in anhydrous isopropanol, was added to 13 g. of the γ-diethylaminopropyl amide of α,α-diphenyl-p-toluic acid dissolved in 40 ml. of butanone. The solution was refrigerated and seeded. Seed crystals were obtained by refrigeration of a small sample of the butanone solution and dilution with anhydrous ethyl ether. The precipitated hydrochloride was recrystallized from butanone and was obtained as 10.2 g. of a white, water-soluble, crystalline powder melting at 170–172°.

I claim:

1. A member of the class of compounds consisting of dialkylaminoalkyl amides of an α,α-diaryl substituted toluic acid of the structural formula

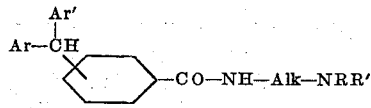

and salts thereof, wherein Ar and Ar' are members of the class consisting of aryl hydrocarbon radicals containing 6 to 10 carbon atoms, anisyl radicals and halogenated phenyl radicals, Alk is a lower alkylene radical containing at least 2 carbon atoms, and R and R' are lower alkyl radicals.

2. A dialkylaminoalkyl amide of an α,α-diaryl substituted o-toluic acid of the structural formula

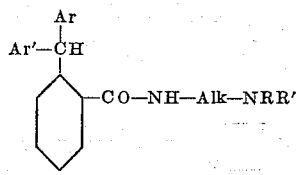

wherein Ar and Ar' are lower aryl hydrocarbon radicals containing 6 to 10 carbon atoms, Alk is a lower alkylene radical containing at least 2 carbon atoms, and R and R' are lower alkyl radicals.

3. A dialkylaminoalkyl amide of α,α-diphenyl-o-toluic acid of the structural formula

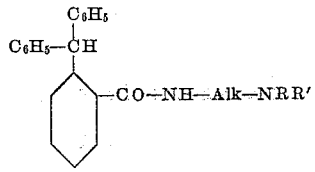

wherein Alk is a lower alkylene radical containing at least 2 carbon atoms, and R and R' are lower alkyl radicals.

4. A diethylaminoalkyl amide of α,α-diphenyl-o-toluic acid of the structural formula

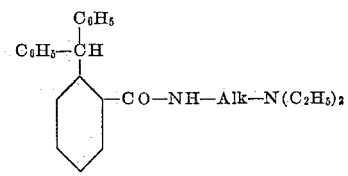

wherein Alk is a lower alkylene radical containing at least 2 carbon atoms.

5. A dialkylaminoalkyl amide of an α,α-diaryl substituted p-toluic acid of the structure formula

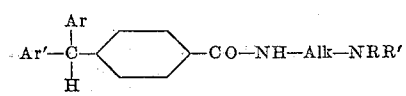

wherein Ar and Ar' are lower aryl hydrocarbon radicals containing 6 to 10 carbon atoms, Alk is a lower alkylene radical containing at least 2 carbon atoms, and R and R' are lower alkyl radicals.

6. A dialkylaminoalkyl amide of α,α-diphenyl-p-toluic acid of the structural formula

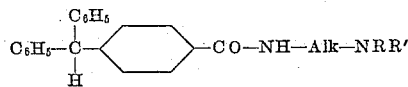

wherein Alk is a lower alkylene radical containing at least 2 carbon atoms, and R and R' are lower alkyl radicals.

7. A diethylaminoalkyl amide of α,α-diphenyl-p-toluic acid of the structural formula

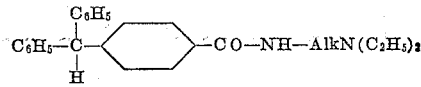

wherein Alk is a lower alkylene radical containing at least 2 carbon atoms.

8. An (α,α - diaryltoluamidoalkyl) trialkylammonium salt of the structural formula

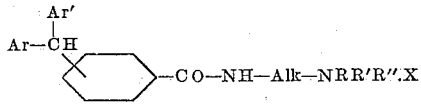

wherein Ar and Ar' are lower aryl hydrocarbon radicals containing 6 to 10 carbon atoms, Alk is a lower alkylene radical containing at least 2 carbon atoms, and R, R' and R'' are lower alkyl radicals and X is one equivalent of an anion.

9. An (α,α - diphenyltoluamidoalkyl) trialkylammonium salt of the structural formula

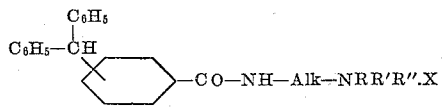

wherein Alk is a lower alkylene radical containing at least 2 carbon atoms and R, R', and R'' are lower alkyl radicals and X is one equivalent of an anion.

10. An (α,α - diphenyltoluamidoalkyl) diethylalkylammonium salt of the structural formula

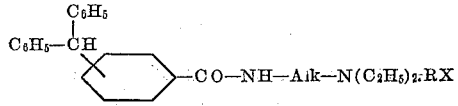

wherein Alk is a lower alkylene radical containing at least 2 carbon atoms, R is a lower alkyl radical, and X is one equivalent of an anion.

11. An (α,α - diphenyl - o - toluamidoalkyl) diethylalkylammonium salt of the structural formula

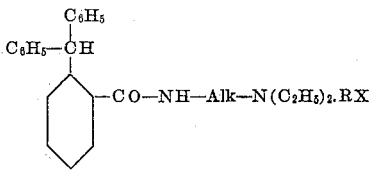

wherein Alk is a lower alkylene radical containing at least 2 carbon atoms, R is a lower alkyl radical, and X is one equivalent of an anion.

12.

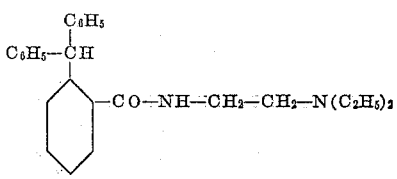

13.

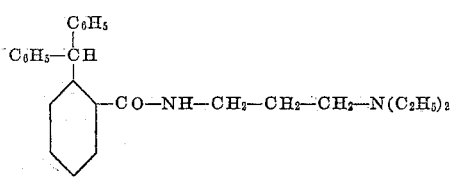

14.

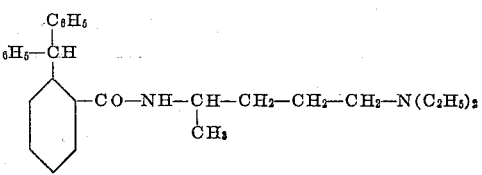

15.

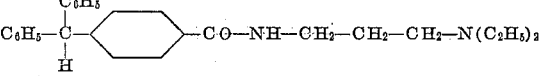

16.

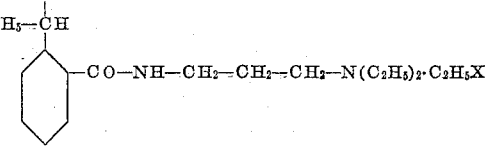

wherein X is a halide ion.

References Cited in the file of this patent

UNITED STATES PATENTS

| Number | Name | Date |
|---|---|---|
| 2,009,144 | Miescher et al. | July 23, 1935 |
| 2,302,805 | Schussler | Nov. 24, 1942 |

OTHER REFERENCES

Jones et al.—Jour. Am. Chem. Soc., vol. 48, pages 188, 192, January 1926.